Aug. 28, 1962      H. E. DAHLKE      3,050,998
FLOW MEASURING STRAIN GAUGE TRANSDUCERS
Filed July 1, 1959      5 Sheets-Sheet 3
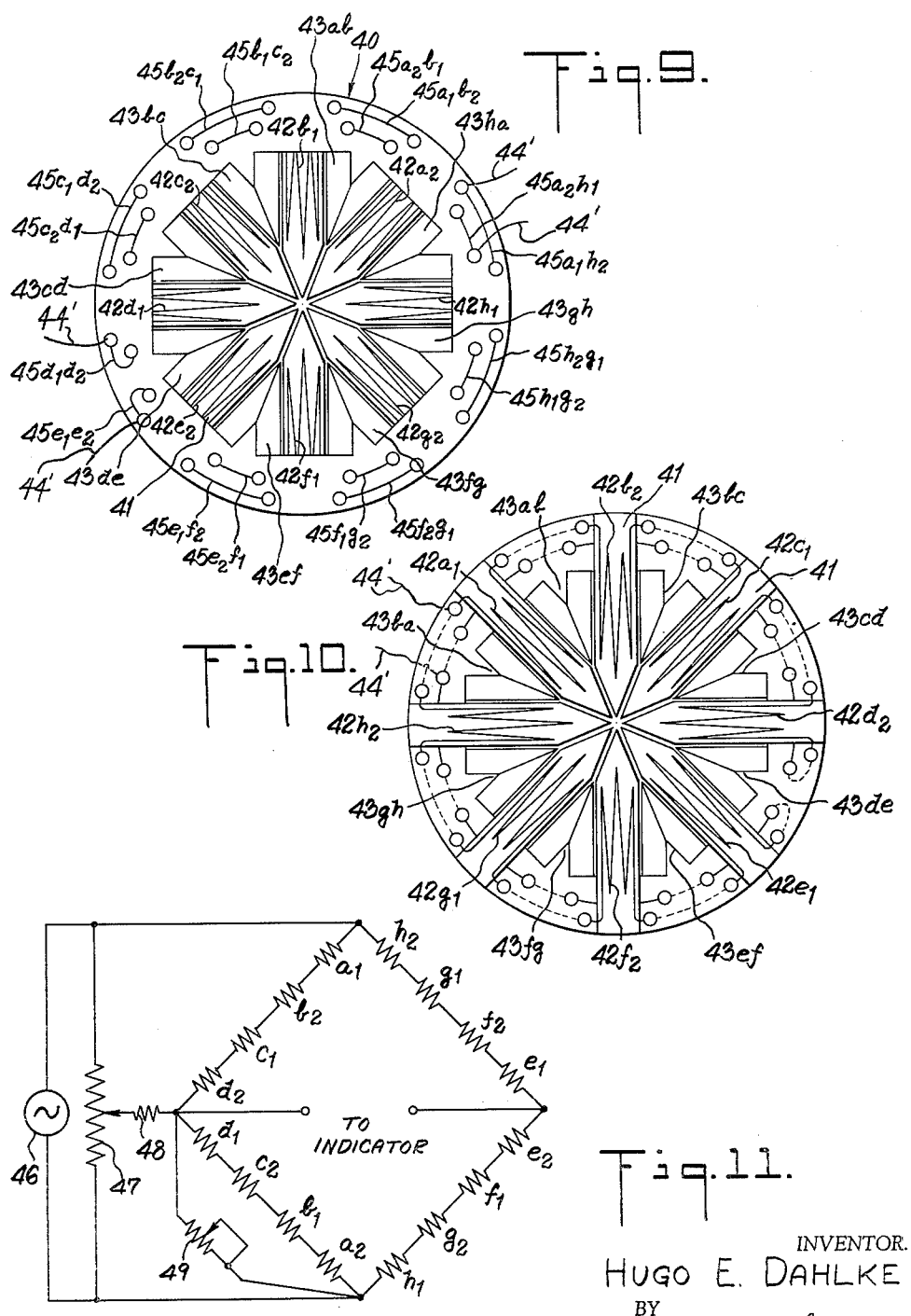
INVENTOR.
HUGO E. DAHLKE
BY
Cyrus D. Samuelson
ATTORNEY INVENTOR.
HUGO E. DAHLKE
BY
Cyrus D. Samuelson
ATTORNEY

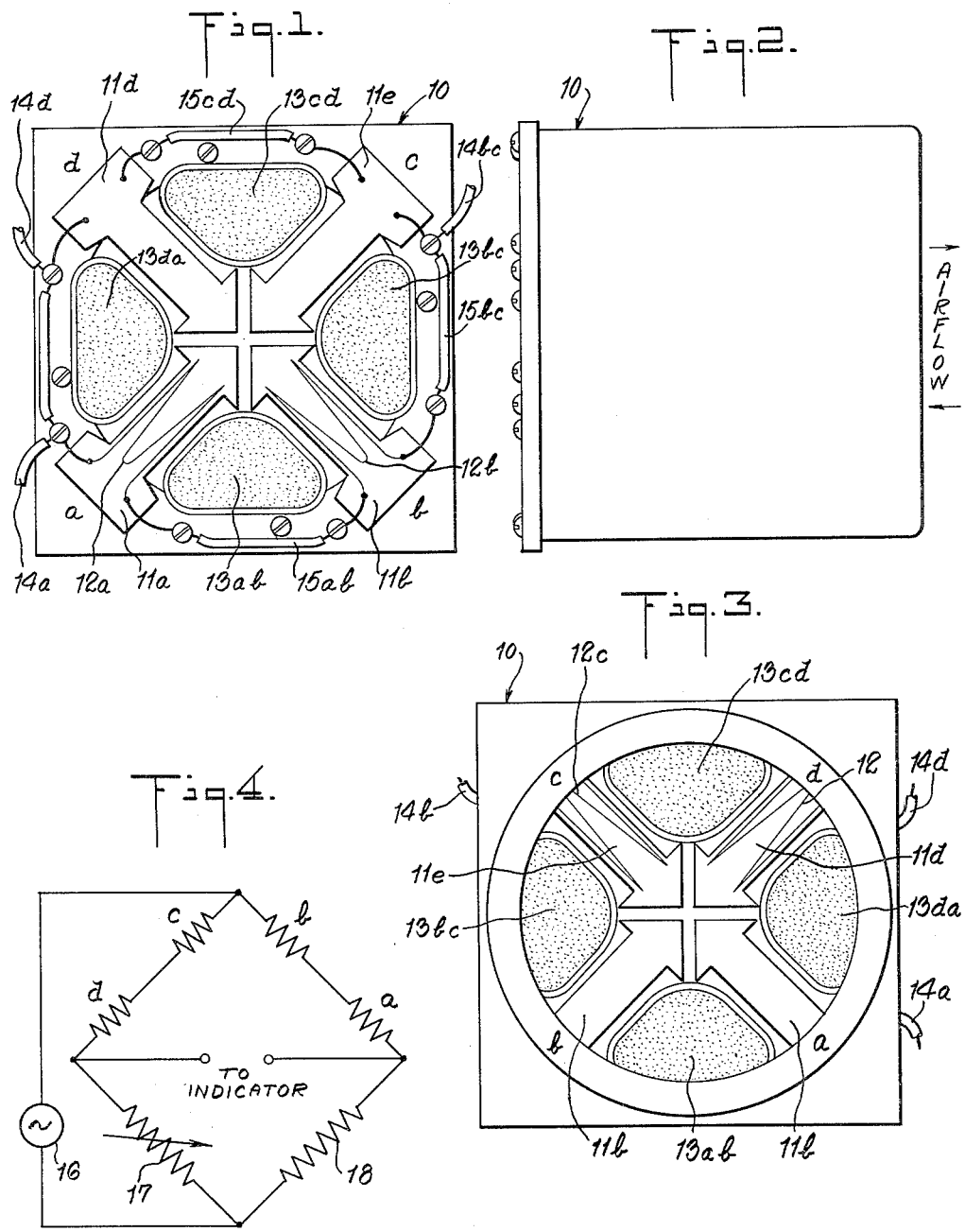

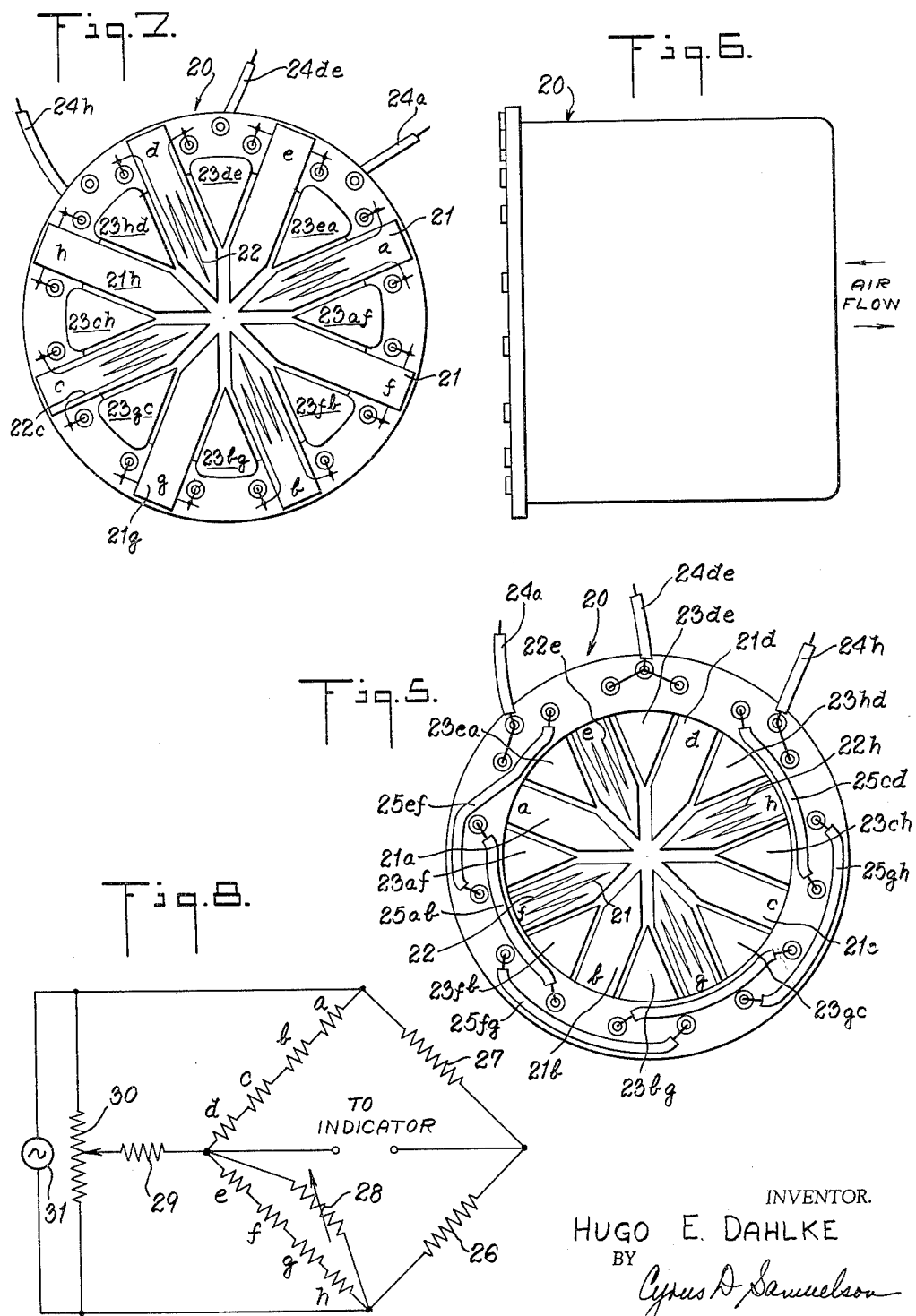

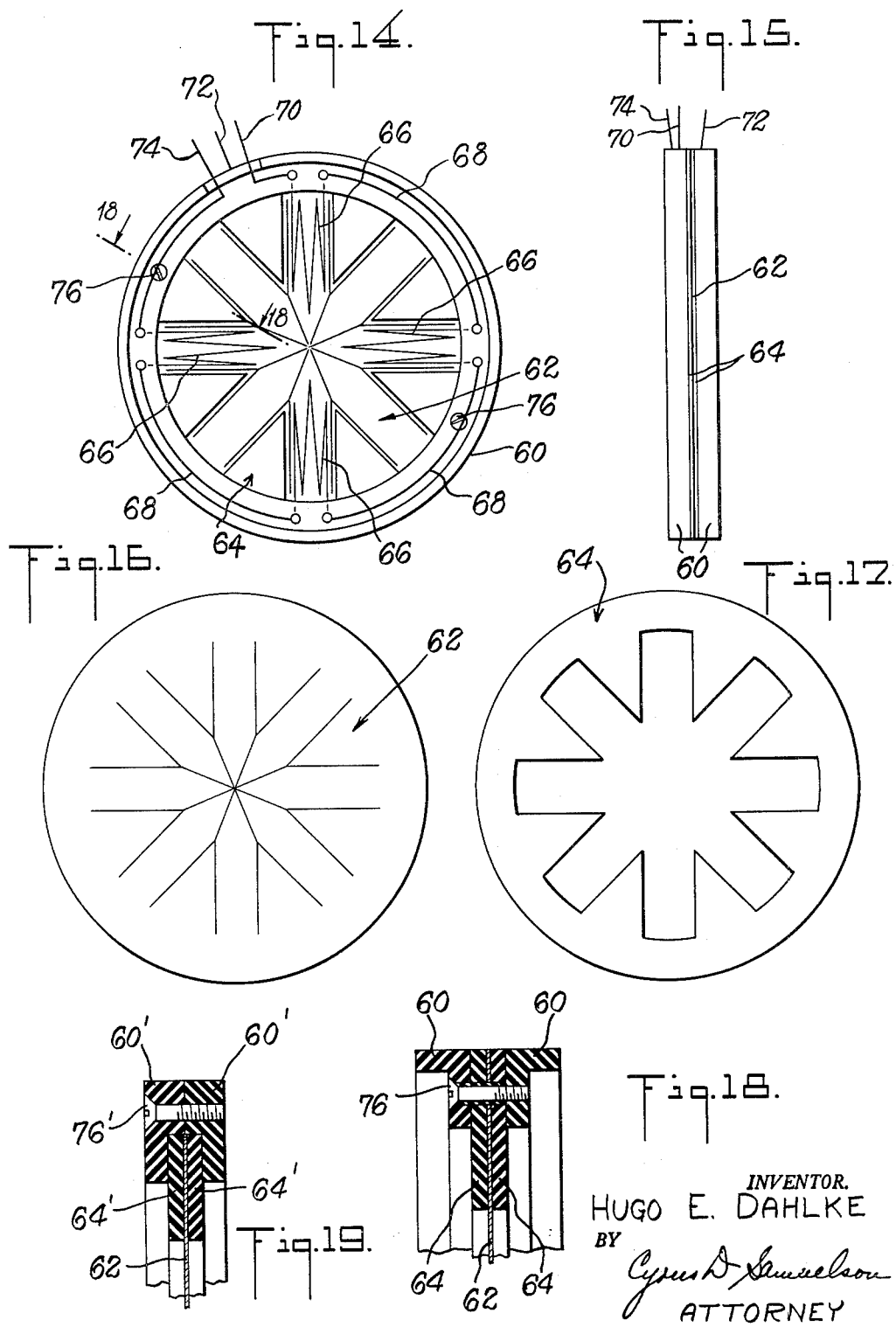

United States Patent Office 3,050,998
Patented Aug. 28, 1962

3,050,998
FLOW MEASURING STRAIN GAUGE
TRANSDUCERS
Hugo E. Dahlke, East Brunswick, N.J., assignor to Gulton Industries, Inc., Metuchen, N.J., a corporation of New Jersey
Filed July 1, 1959, Ser. No. 827,673
19 Claims. (Cl. 73—228)

This application is a continuation-in-part of my application Serial Number 653,634, filed April 18, 1957.

My invention relates to strain gauge transducers which are used for the measurement of the flow of air or gases and in particular to such devices which are employed to measure the air flow during breathing.

Strain gauge transducers have been used for the measurement of pressure, fluid flow, structural deformations and similar phenomena. There has existed in the art, a need for a transducer which is sensitive enough to measure the air flow during breathing and which is rugged enough to withstand shocks due to high acceleration forces. There has also been a need for such a transducer which may be biased so that the user may easily determined the direction of the air flow in addition to the velocity.

Accordingly, it is a principal object of my invention to provide a strain gauge transducer which may be used for the measurement of respiratory air flow.

It is a further object of my invention to provide such a transducer which may be used to measure the direction of the air flow.

It is a still further object of my invention to provide such a transducer with high sensitivity.

It is a still further object of my invention to provide such a transducer which may be produced economically and simply.

Figure 12:
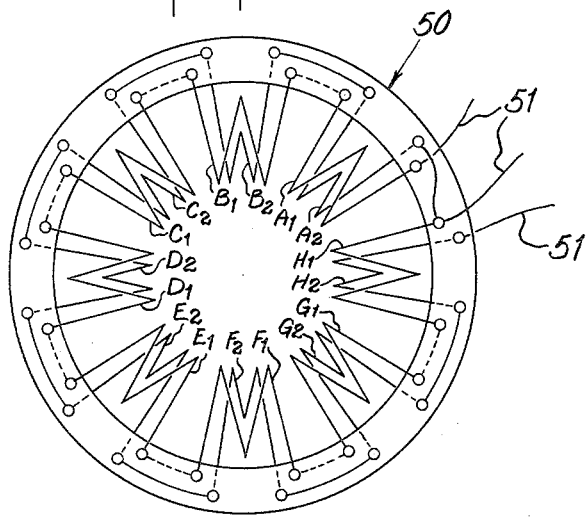
Figure 13:
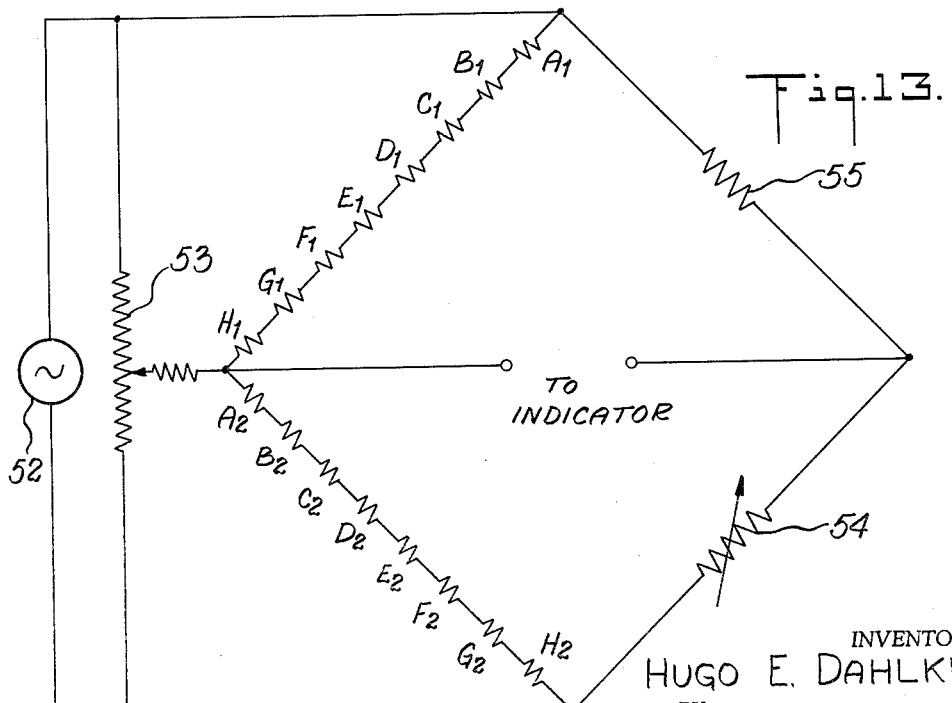

These and other objects, advantages, features, and uses will become more apparent as the description proceeds when considered in view of the accompanying drawings in which:

FIGURE 1 is a front elevational view of an embodiment of my invention utilizing four strain resistance elements, FIGURE 2 is a side elevational view of the embodiment of FIGURE 1, FIGURE 3 is a back elevational view of the embodiment of FIGURE 1, FIGURE 4 is a schematic diagram of the electrical circuit of the embodiment of FIGURE 1, FIGURE 5 is a front elevational view of an alternative embodiment of my invention utilizing eight strain resistance elements, FIGURE 6 is a side elevational view of the embodiment of FIGURE 5, FIGURE 7 is a rear elevational view of the embodiment of FIGURE 5, FIGURE 8 is a schematic diagram of the electrical circuit of the embodiment of FIGURE 5, FIGURE 9 is a front elevational view of an alternative embodiment of my invention wherein there are strain wires affixed to both sides of the thin sheets, FIGURE 10 is a rear elevational view of the embodiment of FIGURE 9, FIGURE 11 is a schematic diagram of the electrical circuit used in conjunction with the embodiment of FIGURE 9, FIGURE 12 is a simplified front elevational view of a further alternative embodiment of my invention wherein there are strain wires affixed to both sides of the thin sheets, FIGURE 13 is a schematic diagram of the electrical circuit used in conjunction with the embodiment of FIGURE 12, FIGURE 14 is a front elevational view of a further alternative embodiment of my invention utilizing eight strain resistance elements, FIGURE 15 is a side elevational view of the embodiment of FIGURE 14, FIGURE 16 is a front elevational view of the thin metal element to which the strain wires are affixed, FIGURE 17 is a front elevational view of the baffle assembly used on the embodiment of FIGURE 14, FIGURE 18 is a cross-sectional view along the lines 18—18 of FIGURE 14, and FIGURE 19 is a view similar to FIGURE 18 of an alternative form of the embodiment of FIGURE 14.

In the drawings, wherein, for the purpose of illustration, are shown preferred embodiments of my invention, the numeral 10 designates the four element transducer, generally, whose body is formed of Fiberglas or similar material. 10 comprises four arrow-shaped thin metal sheets 11 which are affixed at their outer ends to the body of 10 and have their opposite ends symmetrically placed close together at the center of the front face of 10. These sheets 11 have been designated 11a, 11b, 11c, and 11d to correspond with elements a, b, c and d. Thin insulated strain responsive wire 12, in the form illustrated, is cemented to each sheet 11, those for a and b being on the front side and those for c and d being on the back side of their respective sheets 11. Lead 14a makes connection to the external electrical circuit from one side of a, lead 14d makes connection to the external circuit from one side of d, and lead 14bc makes connection from one side of b and c, b and c being joined by jumper 15bc. Jumper 15ab connects the second sides of a and b and jumper 15cd connects the second sides of c and d. Baffles 13 are more particularly designated 13ab, 13bc, 13cd, and 13da in accordance with their location between the strain elements a and b, b and c, c and d, and d and a, respectively. Strain responsive resistances, elements a, b, c and d, are connected in a bridge circuit as shown in FIGURE 4, resistor 17 being variable and 18 being fixed. 16 is a source of alternating voltage.

20 designates an eight element strain gauge, generally, whose body is formed of Fiberglas or similar material and comprises thin arrow-shaped metal sheets 21 designated 21a through 21h to correspond with elements a through h respectively. Sheets 21 are affixed at their outer ends and have their opposite ends symmetrically placed close together at the center of the front face of 10. Then insulated strain responsive wire 22, in the form illustrated, is cemented to sheets 21; 22a, 22b, 22c and 22d are on the back side of 21a, 21b, 21c and 21d and 22e, 22f, 22g and 22h are on the front side of 21e, 21f, 21g and 21h. Elements a, b, c and d are connected in series by jumpers 25ab, 25bc and 25cd. The open end of d is connected to one side of e and thence to the external circuit by lead 24de. Likewise, elements e, f, g and h are connected in series by jumpers 25ef, 25fg and 25gh. The open ends of a and h are connected to the external circuit by leads 24a and 24h. Strain responsive resistance elements a through h are connected in a bridge circuit as illustrated in FIGURE 8. Resistors 26 and 27 are fixed and make up the other two arms of the bridge. Resistors 28, 29, and 30 serve to adjust the balance of the bridge, 28 and 30 being variable and 29 being fixed. 31 represents a source of alternating voltage. Baffles 23 are more particularly designated 23af, 23fb, 23bg, 23gc, 23ch, 23hd, 23de and 23ea depending upon their respective locations between the elements a through h.

Baffles 13 and 23 are formed of wire mesh or similar screen-like material and serve to match the impedances and to increase the velocity of air which impinges on 11 and 21 respectively. 11 and 21 are formed of thin sheet metal or other material with a high elastic constant.

Wires 12 and 22 are cemented on 11 and 21 respectively so that the greatest part of 12 and 22 is placed in the longitudinal dimension of 11 and 21. Since elements 11 and 21 bend under the influence of the air stream, 12 and 22, which are cemented to 11 and 21, elongate or compress in accordance with the direction of the bending. It can thus be seen that the only portions of 12 and 22 which will change in dimension under these stresses are those which are in substantially the longitudinal direction of 11 and 21.

In FIGURES 9 and 10, the numeral 40 generally designates an eight element transducer of my invention with strain responsive resistance wires affixed to both sides of the thin sheets. The eight thin sheets are designated 41 and the resistance wires affixed thereto are respectively designated $42a_1$, $42a_2$, $42b_1$, $42b_2$, $42c_1$, $42c_2$, $42d_1$, $42d_2$, $42e_1$, $42e_2$, $42f_1$, $42f_2$, $42g_1$, $42g_2$, $42h_1$, and $42h_2$. Wires designated with the same letter but with different subscripts are on opposite sides of the same strip 41. The baffles between the various strips 41 are respectively designated $43ab$, $43bc$, $43cd$, $43de$, $43ef$, $43fg$, $43gh$ and $43ha$. The various connections between the strips are made by jumpers designated as follows: $45a_1b_2$ (between $42a_1$ and $42b_2$), $45a_2b_1$ (between $42a_2$ and $42b_1$) and so on for all such electrical connections. These connections are made so that four resistance elements on one side of the strips 41 are in series in one leg of the bridge shown in FIGURE 11. Connections to the external bridge circuit are made by leads 44′ one of which is connected to each of the following jumpers: $45a_2h_1$, $45a_1h_2$, $45d_1d_2$ and $45e_1e_2$. The source of potential for the bridge (FIGURE 11) is designated 46 and resistors 47, 48 and 49 are used to balance the bridge when there is no air flow.

In FIGURE 12 there is illustrated a simplified view of transducer 50 which view is similar to that of FIGURE 9. In FIGURE 12, the strain responsive wires affixed to one side of the strips (not shown) are designated with the subscript 1 and those on the other side with the subscript 2. All those on one side are connected in series in one leg of the bridge of FIGURE 13 and those on the other side are connected in series in a second leg of the bridge. Thus, $A_1$, $B_1$, $C_1$, $D_1$, $E_1$, $F_1$, $G_1$ and $H_1$ are in one leg and $A_2$, $B_2$, $C_2$, $D_2$, $E_2$, $F_2$, $G_2$ and $H_2$ are in a second leg. Leads 51 are provided to make electrical connections from the external circuit to $A_1$, $H_2$ and the junction of $A_2$ and $H_1$. The source of potential for the bridge is designated 52. Resistors 55 and 54 are each in one arm of the bridge and together with resistor 53 serve to balance the bridge when there is no air flow.

In FIGURE 14 there is illustrated a further alternative embodiment of my invention. Output connections 70, 72 and 74 are connected in the same manner as connections 24a, 24de and 24h of FIGURES 5 and 7. The embodiment of FIGURES 14 through 18 comprises a thin metallic sheet 62 in which a plurality of arrow-shaped strips have been cut as shown in FIGURE 16. In the particular embodiment illustrated, eight such arrow-shaped strips have been provided. Bakelite insulating elements 64 are placed on both sides of sheet 62 so that there is a rigid baffle between each pair of arrow-shaped strips. This causes the air to operate on the arrow-shaped strips and not on the portions of sheet 62 between the strips. The combination is held in place by means of a pair of insulating rings 60 which are held in position by means of screws 76. Screws 76 may be insulated, by means of a bushing, from sheet 76 as shown in FIGURE 18 or they may make electrical contact with sheet 62, if such insulation is unnecessary. FIGURE 19 illustrates an alternative method of assembling transducers similar in construction to those of FIGURES 14 through 18. Sheet 62 is smaller in radius than rings 60′ and sheet 62 is held between insulating elements 64′ which are held in place by means of rings 60′ which are held in place by means of screws 76′.

Strain responsive wires 66 are affixed to the arrow-shaped strips so that the wires on adjacent strips are on opposite sides of device. The electrical connections in this embodiment are similar to those illustrated in FIGURES 5 through 8 and described in connection therewith. Electrical connections between wires 66 and to the output wires 70, 72 and 74 are made by means of jumpers 68. Under certain conditions insulating elements 64 and rings 60 may be dispensed with and the transducer may comprise sheet 62 to the arrow-shaped strips of which wires 66 have been affixed.

In operation, 10 is placed in the stream so that the air flow is in either of the directions indicated by the arrows of FIGURE 2. The flow is normal to elements 11. The air flow causes all four sheets 11 to stress in the same direction. Let us assume flow in the direction of the lower arrow of FIGURE 2. Then sheets 11 of FIGURE 1 will be pushed out from the drawing and 12a and 12b will be compressed whereas 12c and 12d will be elongated, whereby a and b will decrease in resistance while c and d will increase in resistance.

FIGURE 4 illustrates a preferred circuit for measuring air flow with the embodiment of FIGURES 1 through 3. An alternating voltage is applied by 16 and the bridge is balanced by means of 17 with no air flow. For example, balance may be determined by means of a null indication on the indicator (not shown). The indicator may be a sensitive meter, oscilloscope, amplifier and meter or any other suitable indicating device. With air flow, the bridge goes out of balance and there is a current indication on the indicator proportional to the velocity of air flow. From the above, it can be seen that if there is air flow of a given velocity in the direction of either of the arrows of FIGURE 2, the display on the indicator will be the same. In order to obtain an indication of direction and amplitude on the indicator, a source of direct current voltage is substituted for 16 so that a reading of one polarity indicates air flow in one direction and a reading of the opposite polarity indicates air flow in the opposite direction. Greater sensitivity may be obtained if each element a, b, c and d is placed in a separate arm of the bridge and a balancing resistor is connected across one or two of them but such a bridge is much harder to balance and I have found that the stability of the circuit of FIGURE 4 is more desirable than the slightly increased sensitivity of the alternative circuit.

The operation of the device of FIGURES 5 through 7 is the same in principle as that of FIGURES 1 through 3. Wires 22a, 22b, 22c and 22d are on the back of sheets 21a, 21b, 21c and 21d and wires 22e, 22f, 22g and 22h are on the front of sheets 21e, 21f, 21g and 21h. The elements are connected in the bridge circuit of FIGURE 8 with all the elements which are on the front side of sheets 21 in series in one leg and all those which are on the back side of sheets 21 in series in another leg. 26 and 27 are fixed resistors and make up the other two legs of the bridge. 28, 29 and 30 are used to balance the bridge when there is no air flow. 31 is a source of alternating voltage which is applied to the bridge.

All the discussion concerning the indicator and the application of a direct current voltage in lieu of the alternating voltage supplied by 31 is equally valid for the embodiment of FIGURES 5 through 8 as for that of FIGURES 1 through 4. And as in the case of the embodiment of FIGURES 1 through 4, I have also found that I achieve more stability, with slightly less sensitivity when utilizing the circuit of FIGURE 8 than I obtain with strain elements connected in all four arms of the bridge.

I have found that the sensitivity of strain gauge transducers of my invention is increased when strain responsive resistance wires are cemented on both sides of each resilient element. With such construction, the wires on the front sides of the resilient elements are connected in series in one leg of the bridge and those on the back sides of the resilient elements are connected in series in a second leg of the bridge.

The operation of the devices of FIGURES 9 and 10 and 12 is the same in principle as that of FIGURES 1 through 3 and 5 through 7. Similarly, the discussion with respect to the indicator and the employment of direct current voltage in lieu of alternating current voltage is equally as valid for these embodiments as for the previously discussed embodiments. However, there is less sensitivity obtained with the embodiment of FIGURE 12 than with the embodiment of FIGURES 9 and 10.

The operation of the device of FIGURES 14 through 19 is similar to that of FIGURES 5 through 7 since these embodiments are substantially identical electrically. Likewise, the discussion with respect to the indicator and the employment of direct current voltage in lieu of alternating current voltage is equally as valid for the embodiment of FIGURES 14 through 19 as for the previously discussed embodiments. Moreover, all of the embodiments of FIGURES 1 through 13 may use the rings 60 or 60' of FIGURES 14 through 19 in place of the hollow bodies 10 and 20. Transducers of my invention using the rings 60 and as illustrated in FIGURES 14 through 19 may be employed to measure fluid or gas flow by placing the transducer in the flow stream such that the flow is substantially normal to the plane of the arrow-shaped strips of the transducer.

While I have described my invention by means of specific examples and in specific embodiments, I do not wish to be limited thereto for obvious modifications will occur to those skilled in the art without departing from the spirit of the invention or the scope of the subjoined claims.

Having thus described my invention, I claim:

1. A strain gauge transducer comprising a hollow body, a plurality of inwardly extending arrow-shaped elastic resilient elements affixed at their outer ends to the periphery of said hollow body and spaced each from each, strain responsive wire elements affixed to said resilient elements and insulated therefrom and stressed thereby, means for connecting said strain responsive wire elements to an external electrical circuit and baffles affixed to the periphery of said hollow body located between said resilient elements.

2. A strain gauge transducer as described in claim 1 wherein there are four resilient elements, and said strain responsive wire elements are affixed to one side of two of said resilient elements and to the opposite side of the remaining two of said resilient elements.

3. A strain gauge transducer as described in claim 2 wherein the strain responsive wire elements affixed on the same sides of said resilient elements are connected in series in one leg of said external electrical circuit.

4. A strain gauge transducer as described in claim 1 wherein there are eight resilient elements and said strain responsive wire elements are affixed to one side of four of said resilient elements and to the opposite side of the remaining four of said resilient elements.

5. A strain gauge transducer as described in claim 4 wherein the strain responsive wire elements affixed on the same sides of said resilient elements are connected in series in one leg of said external electrical circuit.

6. A strain gauge transducer as described in claim 1 wherein said strain responsive wire elements are affixed to both sides of said resilient elements.

7. A strain gauge transducer as described in claim 6 wherein the strain responsive wire elements affixed on the same sides of said resilient elements are connected in series in one leg of said external electrical circuit.

8. A strain gauge transducer comprising a sheet of resilient material, said sheet having formed thereon a plurality of arrow-shaped elastic resilient elements, said arrow-shaped resilient elements being pointed toward the center of said sheet and supported at their outer ends and spaced each from each such that they are furthest apart along the periphery of said sheet, strain responsive wire elements affixed to said arrow-shaped elements and insulated therefrom and stressed thereby and means for connecting said strain responsive wire elements to an external circuit.

9. A strain gauge transducer comprising a sheet of resilient material, said sheet having formed thereon a plurality of arrow-shaped elastic resilient elements, said arrow-shaped elements being pointed toward the center of said sheet and supported at their outer ends and spaced each from each such that they are furthest apart along the periphery of said sheet, strain responsive wire elements affixed to said arrow-shaped elements and insulated therefrom and stressed thereby a pair of insulating sheets having cutouts corresponding to the arrow-shaped elements, one of said insulating sheets being placed on each side of said resilient sheet such that the arrow-shaped elements are exposed and the spaces between adjacent arrow-shaped elements are covered by said insulating sheets, means for holding said sheets in fixed relationship to each other, and means for connecting said strain responsive wire elements to an external electrical circuit.

10. A strain gauge transducer comprising a plurality of spaced, arrow-shaped, elastic, resilient sheets arranged annularly in a plane with the arrows pointed toward the center, strain responsive wire elements affixed to said spaced, arrow-shaped, elastic, resilient sheets and insulated therefrom and stressed thereby, means at the outer ends of said spaced, arrow-shaped, elastic, resilient sheets for normally holding the same in said plane, and means for connecting said strain responsive wire elements to an external electrical circuit.

11. A strain gauge transducer comprising a plurality of spaced, inwardly radially extending, elastic, resilient fingers arranged annularly in a plane, strain responsive wire elements affixed to said elastic, resilient fingers and insulated therefrom and stressed thereby, means at the outer ends of said elastic, resilient fingers for normally holding the same in said plane, and means for connecting said strain responsive wire elements to an external electrical circuit.

12. A strain gauge transducer comprising a plurality of inwardly radially extending, elastic, resilient fingers arranged annularly in a plane, a plurality of solid pieces in said plane arranged such that there is one of said solid pieces located between adjacent elastic, resilient fingers, means at the outer ends of said plurality of radially extending, elastic, resilient fingers for normally holding the same in said plane, strain responsive wire elements affixed to said elastic, resilient fingers and insulated therefrom and stressed thereby and means for connecting said strain responsive wire elements to an external electrical circuit.

13. A flow measuring strain gauge transducer comprising a plurality of inwardly radially extending, elastic, resilient fingers arranged annularly in a plane substantially normal to the flow stream being measured, means at the outer ends of said resilient fingers for normally holding the same in said plane, said resilient fingers flexing out of said plane to an extent dependent upon the flow rate of the flow stream being measured, strain responsive wire elements affixed to said resilient fingers and insulated therefrom and stressed in accordance with the flexing thereof, and means for connecting said strain responsive wire elements to an external electrical circuit for measuring the flow rate of the flow stream being measured.

14. A flow measuring strain gauge transducer as described in claim 13 wherein there are four resilient fingers, and said strain responsive wire elements are affixed to one side of two of said resilient fingers and to the opposite side of the remaining two of said resilient fingers.

15. A flow measuring strain gauge transducer as described in claim 14 wherein the strain responsive wire elements on the same side of said resilient fingers are connected in series in one leg of said external electrical circuit.

16. A flow measuring strain gauge transducer as described in claim 13 wherein there are eight resilient fingers and said strain responsive wire elements are affixed to one side of four of said resilient fingers and to the opposite side of the remaining four of said resilient fingers.

17. A flow measuring strain gauge transducer as described in claim 16 wherein the strain responsive wire elements affixed on the same sides of said resilient fingers are connected in series in one leg of said external electrical circuit.

18. A flow measuring strain gauge transducer as described in claim 13 wherein said strain responsive wire elements are affixed to both sides of said resilient fingers.

19. A flow measuring strain gauge transducer as described in claim 18 wherein the strain responsive wire elements on the same sides of said resilient fingers are connected in series in one leg of said external electrical circuit.

References Cited in the file of this patent

UNITED STATES PATENTS

| | | |
|---|---|---|
| 1,574,460 | Williamson | Feb. 23, 1926 |
| 2,487,681 | Weisselberg | Nov. 8, 1949 |
| 2,488,347 | Thurston | Nov. 15, 1949 |
| 2,805,574 | Jackson | Sept. 10, 1957 |

FOREIGN PATENTS

| | | |
|---|---|---|
| 961,641 | France | May 16, 1950 |